United States Patent [19]

Hackmack

[11] Patent Number: 4,803,789
[45] Date of Patent: Feb. 14, 1989

[54] MILLING DEVICE

[76] Inventor: Alfred Hackmack, Am Deich 30, D-2095 Obermarschacht, Fed. Rep. of Germany

[21] Appl. No.: 11,733

[22] Filed: Feb. 6, 1987

[30] Foreign Application Priority Data

Feb. 6, 1986 [DE] Fed. Rep. of Germany ....... 3603675

[51] Int. Cl.$^4$ ............................. E02F 3/28; E02F 3/78
[52] U.S. Cl. ........................................ 37/117.5; 37/71; 37/DIG. 3; 37/DIG. 12; 299/59
[58] Field of Search ...................... 37/80 A, 71, 117.5, 37/DIG. 3, DIG. 12; 299/57, 59

[56] References Cited

U.S. PATENT DOCUMENTS 3,122,398  2/1964  Tucker ................................... 37/71

FOREIGN PATENT DOCUMENTS 2027096  2/1980  United Kingdom ............... 37/117.5

Primary Examiner—Paul T. Sewell
Assistant Examiner—James Lisehora
Attorney, Agent, or Firm—Thomas L. Adams

[57] ABSTRACT

Earth moving equipment for cutting into the earth employs a container having a forward opening. A holder is mounted in front of the container opening about in the middle thereof. A milling device is mounted on the holder for cutting into the earth. This milling device is positioned in front of the container for throwing cuttings into the container. The milling device includes right and left milling drums having respective axes subtending an obtuse angle with respect to each other. These milling drums each have a plurality of picks for cutting into the earth. The drums have a combined width exceeding that of the container so that the container can follow the milling device into locations cut out by said milling device. The milling drums are closely spaced to allow their picks to cut completely across their combined width without leaving an uncut region between the milling drums.

20 Claims, 2 Drawing Sheets

MILLING DEVICE

BACKGROUND OF THE INVENTION

The present invention concerns a combination of a milling device and a container.

The publication DE-OS No. 28 33 658 describes the combination of a milling device and a container. This equipment has the disadvantage that it can be used only in compacted soil on the surface but not to mill trenches in soft rock.

Contractors currently must use either hydraulic breakers on excavators, dynamite or compressors with hand-hammers or very expensive rock trenchers in order to dig trenches in soft rock.

If hydraulic breakers are used, then one excavator is equipped with a hydralic breaker and has first to break the rock in the planned trench and then either the hydraulic breaker has to be taken off and exchanged with a bucket or, what is more useful, a second excavator has to be on the job in order to do the digging.

Also hydraulic breakers tend to loosen rock unnecessarily for the purpose of pipe-laying. This problem arises because hydraulic breakers cannot work so exactly. Additionally, the breaker makes cracks in the surrounding rock which may be dangerous in cities for nearby buildings. Therefore and because of the much greater noise the breaker is making, the use of the breaker very often is forbidden in cities and towns. Up to now only hand-held breakers with air compressors are allowed.

It is the purpose of this invention to develop a container-milling device combination with which it is possible to mill trenches in soft rock, collect the milled material in a container (as for instance the bucket of an excavator) and then take it out of the trench and unload it at the side of the trench. This purpose is achieved by the equipment described hereinafter.

SUMMARY OF THE INVENTION

In accordance with the disclosed embodiments demonstrating features and advantages of the present invention, there is provided earth moving equipment for cutting into the earth. The equipment has a container having a forward opening. The equipment also has a holder mounted in front of the opening of the container about in the middle thereof. Also included is a milling device mounted on the holder for cutting into the earth. The milling device is positioned in front of the container for throwing its cuttings into the container. The milling device includes right and left milling drums having respective axes subtending an obtuse angle with respect to each other. The milling drums each have a plurality of picks for cutting into the earth. The milling drums have a combined width exceeding that of the container so that the container can follow the milling device into locations cut out by the milling device. The milling drums are closely spaced to allow their picks to cut completely across their combined width without leaving an uncut region between the milling drums.

If a contractor uses the present invention he can have equipment that has the advantage of being smaller and less expensive than conventional excavators because the main job is done by the milling device and not by the break out force of the excavator. In comparison to the expensive rock trenchers there can be achieved a much greater width at greater depth at lower costs.

In comparison with excavators equipped with hydraulic breakers there are the following advantages: only one excavator is needed to loosen the rock and to take it out of the trench. Also, this work can be done in cities much cheaper than with hand-held breakers, and without the danger of cracking rock formations that may support adjoining buildings.

BRIEF DESCRIPTION OF THE DRAWINGS

An example of the innovation is shown in the drawing and described as follows.

DETAILED DESCRIPTION OF THE PREFERRED EMBODIMENTS

Figure 1:
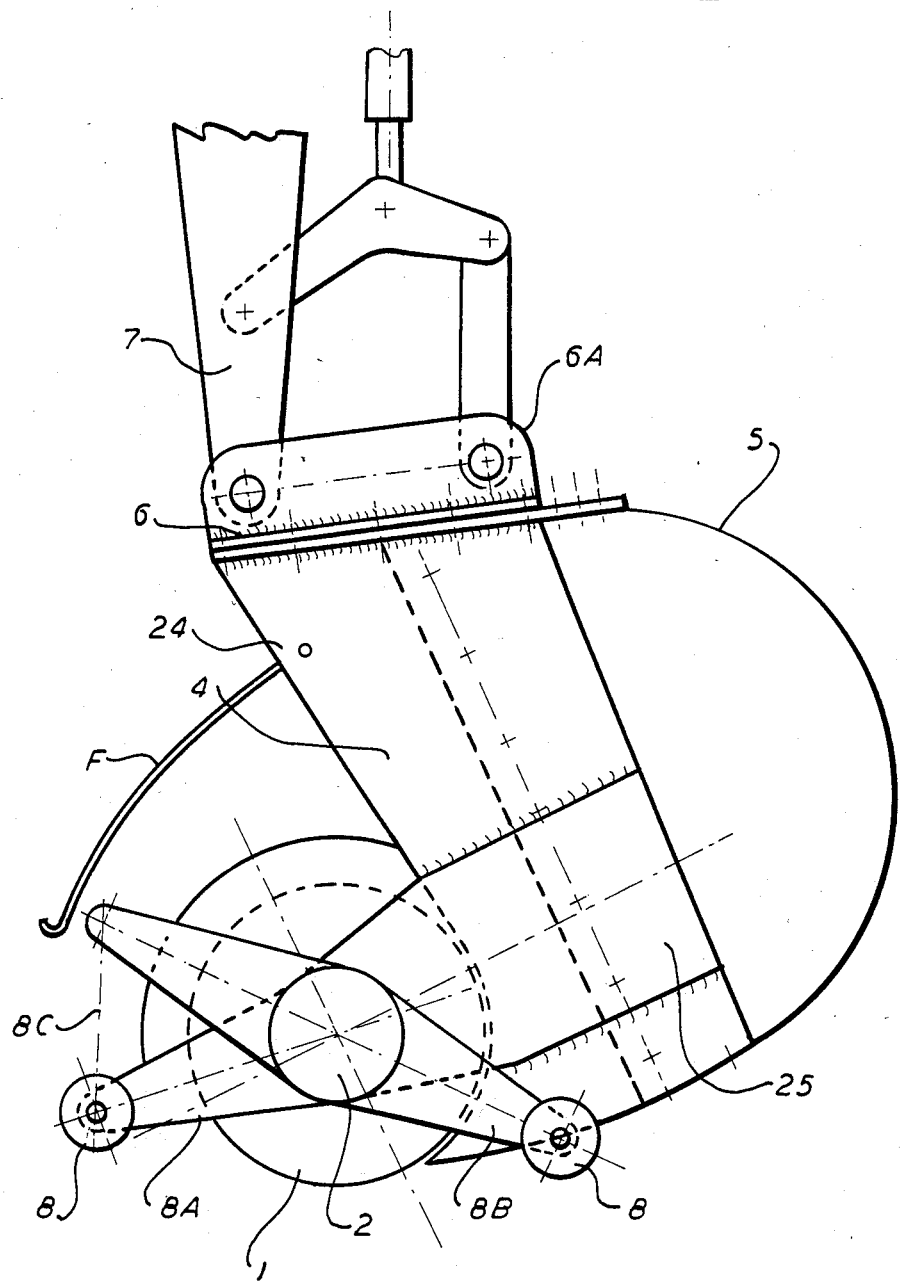
FIG. 1 shows a side view of the container-milling device combination arranged as an attachment for an excavator and equipped with a four-roller depth control device for road planing, according to the present invention.
Figure 2:
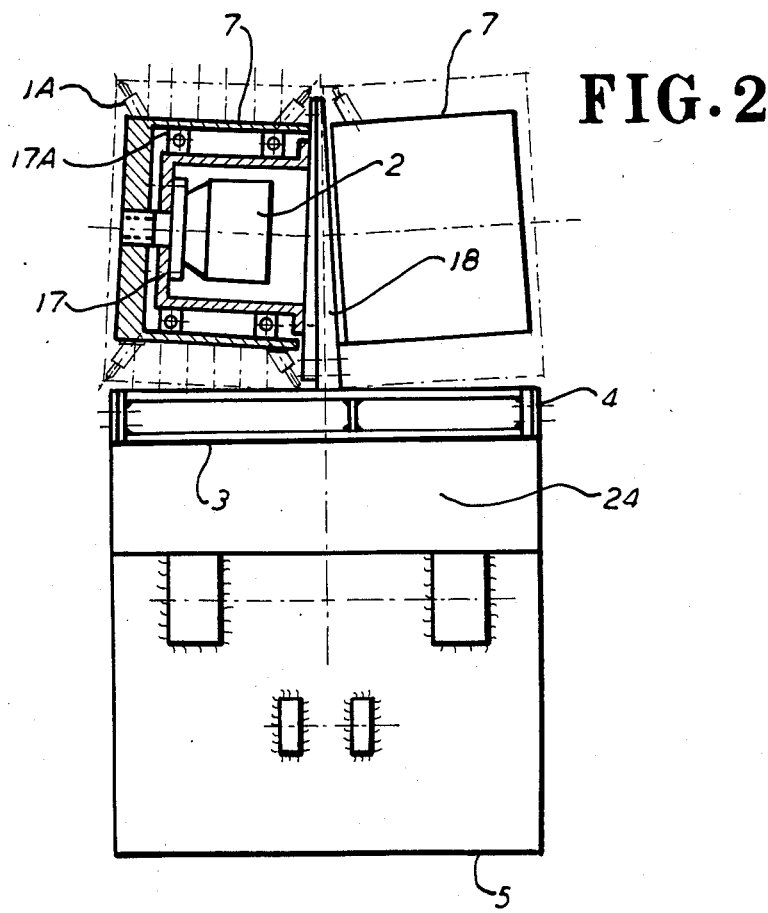
FIG. 2 shows a top view of the equipment of FIG. 1.

Referring to FIGS. 1 and 2, milling drums 1 are hollow steel castings each having a horizontal axis and closed at one end. Mounted on the outside cylindrical surface of drums 1 are a plurality of picks 1A. Picks 1A are replaceable carbide tips secured to sockets welded to the outside of drum 1. The picks 1A mounted along the border of drum 1 are tilted outwardly away from a radially alignment.

The closed end of drums 1 is attached to the shaft of hydraulic motor 2, which is mounted within drum 1. Motor 2 is supported on a central plate or mounting wall 18 fixed to a horizontal cross beam 3. Beam 3 is attached to upwardly extending legs shown as beam 4. The foregoing constitute the holder. Upward beam 4 is welded to a horizontally extending adapter plate 6. Upper plate 6 has vertical journal plate 6A for attachment to boom 7 of an excavator. Also mounted on boom 7 behind drum 1 is bucket 5.

Fixed on vertical beam 4 are additional holder plates 25 on which are mounted a support-depth control device with four rollers 8 for road planing. Rollers 8 are rotatably mounted on the ends of scissor-like struts 8A and 8B. These struts may be fixed at a given angle or, preferably, held at an adjustable angle by a screw jack (not illustrated) spanning struts 8A and 8B at position 8C. By adjusting the angle between struts 8A and 8B the height of holder beam 3 and drums 1 can be set.

In some embodiments a pair of rollers can be used instead of four. This alternate support-depth control device can be fixed directly below the horizontal beam 3 for trench milling. The angle of the boom 7 of the excavator (not shown) can be changed to correspondingly change the depth to which milling drums 1 work.

In FIG. 2 are shown the two drums 1 with their respective axes at an obtuse angle and the two hydraulic motors 2 inside the drums. The hydraulic motors 2 are mounted on a piece of pipe 17 having a closed outer end and a flanged inner end. Pipe 17 is bolted to wall 18. Pipe 17 has mounted around it two bearings 17A for rotatably supporting drums 1. Both pieces of pipes 17 are fixed on a central holder 18 whose faces are bevelled to establish the obtuse angle between the drum axes. Holder 18 is connected with a horizontal beam 3 which is fixed on a vertical beam 4.

Being constructed in this fashion, the foregoing apparatus has the definite advantages. It is possible to dig and unload easily because two milling drums 1 are fixed only in the middle on the holder 3, 4; and because the drums 1 are wider than the container 5 and further cut the rock in the middle, on account of the obtuse angle. It is therefore possible to dig trenches in soft rock, collect the milled material in the bucket 5, take it out of the trench and unload it on the side of the trench, if this equipment is mounted on the boom 7 of an excavator or other type of earth moving equipment.

Figure 3:
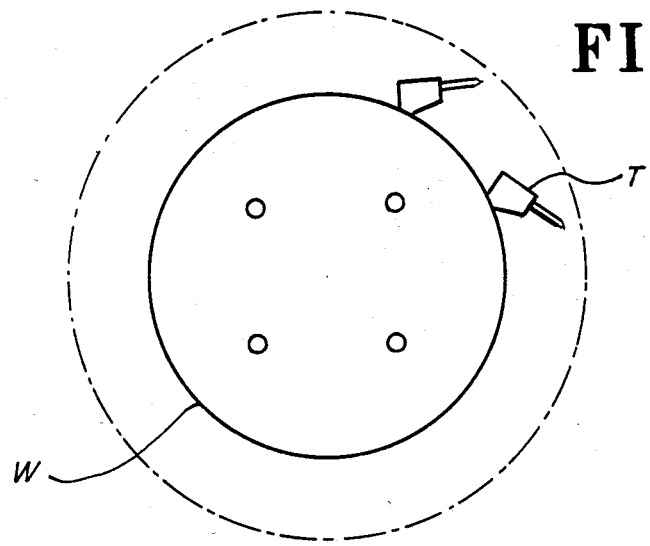
FIG. 3 is a side view of a widening attachment.

Referring to FIG. 3, a widening device W can be attached to both sides of the drums (drums 1 of FIG. 1). Widening device W is a cylindrical hub shaped similarly to drums 1 and bolted to the outside faces of the drums 1. Widening device W is also fitted with picks T. Therefore a single base unit can be used with the same rock milling bucket for different trench widths.

In tight and narrow tunnel construction work where it is not possible to turn the boom of the excavator, it is advantageous to have an auger (not shown) in the container 5 in order to empty the container to the side into a lorry (not shown) without turning the boom or the upper carriage (not shown) of the excavator.

Depending upon the kind of milled material the drum 1 can be equipped with fling sheets F (not shown). Fling sheets F are fabric covers mounted atop the equipment to partially enclose it. By covering most of the drum 1, dust generated from the milling operation can be contained.

To facilitate an understanding of the principles of the present invention, the operation of the foregoing equipment will now be briefly described. Container 5 may be a bucket of an excavator having a boom 7. Alternatively container 5 can be specially designed for the present purposes. Accordingly plate 6A of adapter plate 6 is attached to boom 7 as would be the bucket of an excavator. Hydraulic lines from the excavator can be connected to hydraulic motors 2 to rotate them.

Accordingly, drums 1 are rotated. Boom 7 may be now placed upon the ground to dig a trench through soft rock. The trench is extended by moving the excavator carrying boom 7. Alternatively, drums 1 can be applied to a road surface to mill or plane it. For the purposes of this disclosure, reference to milling, cutting or planing earth includes performing such operations on a road surface.

A further advantage of the inventive equipment, in comparison to the hydraulic breaker, is the fact that the rock is milled to very fine aggregate which can easily be refilled and compacted. Furthermore, because of the accuracy of milling, the walls and the bottom of the trench are even. There will be no rock loosened which is not necessary for the pipe-laying.

Support-depth control device 8, 8A, 8B can be useful as well for milling trenches and for making road planing work with the inventional equipment. If the rollers 8 of the support-depth control device are pressed on the milled surface of the trench or the road, there are two advantages: firstly the shuddering which happens by doing milling work will be minimized. This shuddering will not be transferred to the boom and the excavator. Secondly, the depth of the milling can be controlled by tilting the bucket 5 with the milling device 1 over the axis of the rollers 8, which are pressed on the surface. A four-roller, support-depth device can be used for keeping the milling depth always the same in a relation to the surface independently of the movements of the boom (e.g. when performing road planing).

It is an advantage to be able to separate the milling device 1 and the bucket 5 because in some instances it can be useful to use the milling device on its own; for instance for cutting profiles in tunnels.

It will be appreciated that various modifications and alterations to the foregoing preferred embodiments are possible within the scope of the present invention. For example, the milling drum can be attached to the container with other framing devices. Also, the holder can include various hoods and guards to shield the milling device and reduce dust. Also the angle between the milling devices can be altered depending upon the type of rock and the desired trench profile. Additionally, the number and type of pick can be changed depending upon the rock or desired speed of operation. Also the depth controller can take various forms and can be a pair of wheels mounted to either the container or the holder.

Obviously many other modifications to the present embodiment are possible and it is to be understood that various other modifications can be made without departing from the scope of the present invention.

What is claimed is:

1. Earth moving equipment for cutting into the earth, comprising:
   a container having a forward opening;
   a holder mounted in front of said opening about in the middle thereof; and
   a milling device mounted on said holder for cutting into the earth and producing cuttings, said milling device being positioned in front of said container said cuttings being thrown into said container, said milling device further comprising:
   right and left milling drums having respective axes subtending an obtuse angle with respect to each other, said milling drums each having a plurality of picks for cutting into the earth, said milling drums having a combined width exceeding that of said container so that said container can follow the milling device into locations cut out by said milling device, said milling drums being closely spaced to allow said picks to cut completely across said combined width without leaving an uncut region between said milling drums.

2. Earth moving equipment according to claim 1 wherein said milling drums are mounted on axes included to said opening of said container with the outer ends of the axes being spaced a greater distance in front of said opening than the inner ends of said axes.

3. Earth moving equipment according to claim 2 wherein each of said milling drums comprises:
   a cylindrical hub having a curved cylindrical surface supporting said picks, at least some of said picks being mounted along the border of said cylindrical surface and being tilted outwardly from a radial alignment.

4. Earth moving equipment according to claim 3 wherein said hub is hollow, said equipment further comprising:
   at least one motor mounted within said hub for rotating it.

5. Earth moving equipment according to claim 1 wherein said milling device has a bottom where cutting is performed, said forward opening of said container having a lower threshhold proximate to and at about the same height as the bottom of said milling device to receive said cuttings.

6. Earth moving equipment according to claim 1 wherein said holder comprises:
   a cross beam mounted athwart said container.

7. Earth moving equipment according to claim 6 wherein said holder further comprises:
a mounting wall protecting forwardly from mounted on said cross beam, said milling drums being rotatably mounted on opposite sides of said mounting wall.

8. Earth moving equipment according to claim 7 wherein said holder further comprises:
a frame having an upper plate and a pair of spaced legs attached to said upper plate, said cross beam being attached between said legs to span them, said container being attached to and between said legs.

9. Earth moving equipment according to claim 7 where it is built as an attachment for an excavator, backhoe loader, loading shovel, or other moveable earth moving equipment and wherein said holder includes:
attachment means for detachably mounting said holder to any one of said excavator, backhoe loader, loading shovel, or other moveable earth moving equipment.

10. Earth moving equipment according to claim 1 further comprising:
depth control means supported by said holder said depth control means projecting downwardly and bearing against the earth controlling the depth to which said milling device cuts and providing further support to said milling device.

11. Earth moving equipment according to claim 9 further comprising:
carriage means for supporting said container and milling device allowing said container and milling device to move, cut and contain as a single unit.

12. Earth moving equipment according to claim 1 comprising:
at least one widening attachment detachably mounted on the outside of one of said milling drums for cutting more widely than said milling device.

13. Earth moving equipment according to claim 1 comprising:
a pair of widening attachments detachably mounted on the outside of a corresponding one of said milling drums for cutting more widely than said milling device.

14. Earth moving equipment according to claim 13 comprising:
fling sheets mounted on said holder to partially cover said milling device to reduce dust discharging into the atmosphere.

15. Earth moving equipment according to claim 1 wherein the forward opening of said container is sized and reinforced to allow separate use for earth moving.

16. Earth moving equipment according to claim 15 wherein said holder and said milling device is detachably mounted on said container, the forward opening of said container being sized and reinforced to allow separate use for earth moving.

17. A method for moving earth with a boom-mounted container and a pair of milling devices having a combined width exceeding that of said container, comprising the steps of:
mounting said container and milling drums on said boom so that said drums are in front of the opening of said container;
positioning said drums so their axes form an obtuse angle and so there is no cutting gap between them; and
pressing said drums into the earth, allowing said container to follow to receive the cuttings from the drums; and withdrawing said container and dumping the cuttings.

18. A method according to claim 17 comprising the additional steps of:
removing said drums from said boom; and
moving said bottom and container to move earth.

19. A method according to claim 17 employing a supplemental attachment, comprising the additional steps of:
removing said drums and container from said boom;
attaching said supplemental attachment to said boom; and
moving said boom and attachment to move earth.

20. A method according to claim 17 comprising the additional steps of:
removing said container from said boom; and
moving said boom and said milling devices to move earth.

* * * * *